Patented Oct. 19, 1948

2,451,867

UNITED STATES PATENT OFFICE 2,451,867

MELAMINE-FORMALDEHYDE RESIN DISPERSION IN A NONBASIC WATER-SOLUBLE ALCOHOL MEDIUM

Gilbert Pitzl, Buffalo, N. Y., assignor to E. I. du Pont de Nemours & Company, Wilmington, Del., a corporation of Delaware No Drawing. Application July 6, 1944, Serial No. 543,727

8 Claims. (Cl. 260—29.4)

1

This invention relates to the preparation of new resin-containing compositions. More particularly it relates to the preparation of novel stable dispersions of thermosetting hydrophobic resins.

Thermosetting resins of the amino-triazine-aldehyde type, e. g., melamine-formaldehyde resins, and more specifically, trimethylol melamine resins, have recently found wide application in the arts, particularly in coating compositions, as adhesives, as impregnants for paper cloth, wood, etc., and as agents for anchoring moistureproof coatings on cellophane.

Various methods for applying these resins for use as impregnants, adhesives, anchoring agents and the like, have been employed. One method is to dissolve the resin-forming compounds, e. g., melamine and formaldehyde, together with a condensing agent, in water, apply the resulting solution to the material to be treated, and thereafter subject the treated material to heat whereby to form the resin entirely in situ. Another method is to first prepare a partially polymerized water-soluble resin, dissolve the same in water, apply the resulting solution to the material, and thereafter complete the polymerization of the resin in the material to the infusible insoluble state by suitable heating. It is also known to react the resin-forming ingredients to the point where the product exhibits hydrophobic properties, disperse the incompletely polymerized hydrophobic condensation product in an aqueous solution of hydrochloric acid or other strong mineral acid, apply the resulting aqueous dispersion to the material and then complete the conversion of the resin to the final stage in the usual fashion.

However, all of these methods as presently practiced have serious defects. For example, in the first two methods appreciable formaldehyde is evolved during the course of the reaction and since formaldehyde is highly toxic a definite health hazard is involved. The third method of operation does not present this health hazard to the same dangerous degree. However, because many materials, notably Cellophane, viscose rayon, paper, etc., are adversely affected by strong mineral acids, it is manifest that the field of utility of this otherwise desirable method of application is greatly restricted.

An object of this invention, therefore, is to provide stable aqueous dispersions of a thermosetting, partially polymerized hydrophobic resin which dispersions are free of harmful strong mineral acids. A further object is to provide a method for preparing stable aqueous dispersions of thermosetting, incompletely polymerized trimethylol melamine resins condensed to the hydrophobic stage, without the aid of strong mineral acids. These and other objects will more clearly appear hereinafter.

I have now found that incompletely polymerized melamine-formaldehyde resins, e. g., trimethylol melamine resins, in the hydrophobic stage form dispersions with non-basic, water-soluble alcohols from the group consisting of dihydric and trihydric alcohols, and that by adding to these dispersions substantial amounts of water-soluble organic acids, particularly hydroxy acetic acid, there results a stable and apparently colloidal dispersion, hereinafter termed "resin concentrate," which may be diluted with water without precipitation of resin.

Accordingly, the objects of this invention are realized by adding a hydrophobic, partially polymerized condensation product of melamine and formaldehyde to a non-basic, water-soluble alcohol from the group consisting of dihydric and trihydric alcohols, stirring until the resin is completely dispersed after which time at least 40% of hydroxy acetic acid, based on the weight of resin present, is added to form a resin concentrate which may be diluted with water for use as needed. The acid is most conveniently added in aqueous solution.

Any partially polymerized melamine-formaldehyde resin which is in the hydrophobic state, i. e., insoluble in water in concentrations below 35% but soluble within the range of concentrations from 35–70%, may be dispersed in accordance with the principles of this invention. However, because of their availability and present commercial importance, partially polymerized melamine-formaldehyde resins resulting from the condensation to the hydrophobic stage of approximately three mols of formaldehyde with one mol of melamine and insoluble in water at concentrations below about 50% but soluble in concentrations between 50% and 65%, represent a preferred species of resin herein.

Non-basic, water-soluble di- and trihydric alcohols such as glycerol and ethylene glycol constitute preferred disperse mediums.

The relative proportions of resin, water-soluble alcohol disperse medium and hydroxy acetic acid stabilizing agent in the resin concentrate should be held within relatively narrow limits for optimum results and will depend to some extent upon the particular ingredients chosen and the use to which the dispersion is to be put. However, in general it is preferred to disperse 1 part by weight of resin in at least 2 parts by weight of the non-basic, water-soluble di- or trihydric alcohol, and add from 0.4 to 0.6 part of hydroxy acetic acid.

The following specific examples further illustrate the invention but are not to be construed as limitations thereof. Throughout the description and claims, parts and percentage compositions are by weight unless otherwise indicated.

Example I

A partially polymerized hydrophobic melamine-formaldehyde resin was prepared as follows: One part of trisodium phosphate ($Na_3PO_4.12H_2O$) was dissolved in 267.6 parts of aqueous formaldehyde solution (37% formaldehyde by weight) the pH of which had been adjusted to 7.0 with 2% sodium hydroxide solution. The resulting solution was mixed with 126 parts of melamine and was heated with stirring at 86°-88° C. for about five hours at which point a test portion of the reaction mixture gave a precipitate when diluted with an equal quantity of water. The partially polymerized trimethylol melamine resin thus formed was precipitated by adding to the reaction mixture about 1600 parts of acetone, and after drying was ground to a fine powder. The resin thus formed was insoluble in water at concentrations below 35% but a 50% solution could be formed with warm water (40°-50° C.).

Ten (10) parts of the above resin was added to 50 parts of glycerol and the mixture was stirred until the resin was completely dispersed after which time 5 parts of hydroxy acetic acid dissolved in 35 parts of water was added to the dispersion. The resulting resin concentrate was clear and exhibited the "Tyndall" effect characteristic of colloidal dispersions. There was no precipitation of resin even after dilution with water and long standing.

Example II

Ten (10) parts of finely divided Resin 607 [a trade name used by American Cyanamid Company to designate a hydrophobic partially polymerized melamine-formaldehyde resin insoluble in water at concentrations below about 50% but soluble in 60% concentrations in hot water (80°-100° C.)] was added to 50 parts of glycerol and the mixture was stirred until the resin was completely dispersed. Five (5) parts of hydroxy acetic acid dissolved in 35 parts of water was then added with stirring.

The resulting resin concentrate was clear and exhibited a "Tyndall effect" indicating that a colloidal dispersion of the resin had been formed. On dilution with water the dispersion maintained its clarity and there was no detectable precipitation of the resin even after long standing.

Example III

A resin concentrate of the following composition was prepared as in the preceding examples:

| | Parts |
|---|---|
| Melmac resin S-77-V [1] | 10 |
| Glycerol | 50 |
| Hydroxyacetic acid | 5 |
| Water | 35 |

The resulting composition was substantially identical in essential characteristics with the compositions of the previous examples.

[1] Melmac S-77-V is a hydrophobic melamine-formaldehyde resin marketed by American Cyanamid Company, which resin is insoluble in water at concentrations below 35% but is soluble in both cold and warm water at concentrations in the range of from 35%-70%.

Example IV

The composition of Example II was duplicated except that ethylene glycol was substituted for glycerol as the disperse medium with substantially identical result.

The resin concentrate of this invention may be employed wherever thermosetting resins of the melamine-formaldehyde type were formerly used and it possesses an additional advantage in that it is also applicable in those instances where the mineral acid content of the known stabilized hydrophobic resin dispersions exert a harmful effect on the material treated. Furthermore, because the resins of this invention, as applied, are in an advanced stage of polymerization, they are rapidly convertible to the final insoluble stage at relatively low temperatures and hence are particularly applicable to materials which are heat-sensitive.

As set forth in my copending application Serial No. 544,829 filed July 13, 1944, now Patent No. 2,432,542 the resin concentrates of this invention are especially advantageous in connection with the manufacture of wrapping tissue having a base of cellulosic material (e. g., Cellophane) and an anchored moistureproof coating, for several reasons. First, the disperse mediums as well as the stabilizing acid herein disclosed are also softeners for regenerated cellulose films and the like which permits of the simultaneous softening and resin impregnation of the film; secondly, considerably less resin is required as compared with prior art aqueous solutions; and finally, a substantial improvement in anchorage and heat-seal strength results from the use of the concentrate of this invention.

As many apparently widely different embodiments of this invention may be made without departing from the scope and spirit thereof, it is to be understood that this invention is not limited to the specific embodiments thereof except as defined in the appended claims.

I claim:

1. A composition comprising a partially polymerized melamine-formaldehyde resin insoluble in water in concentrations below 35% but soluble within the range of concentrations from 35% to 70%, dispersed in a liquid medium comprising essentially a non-basic water-soluble alcohol from the group consisting of dihydric and trihydric alcohols as the disperse medium and from 0.4 to 0.6 part of hydroxy acetic acid per part of resin, said composition being capable of being diluted with water without precipitation of resin.

2. A composition comprising a partially polymerized trimethylol melamine resin insoluble in water in concentrations below 35% but soluble within the range of concentrations from 35% to 70%, dispersed in a liquid medium comprising essentially a non-basic water-soluble alcohol from the group consisting of dihydric and trihydric alcohols as the disperse medium and from 0.4 to 0.6 part of hydroxy acetic acid per part of resin, said composition being capable of being diluted with water without precipitation of resin.

3. A composition comprising a partially polymerized trimethylol melamine resin insoluble in water in concentrations below 35% but soluble within the range of concentrations from 35% to 70%, dispersed in glycerol and from 0.4 to 0.6 part of hydroxy acetic acid per part of resin.

4. A stable dispersion of partially polymerized trimethylol melamine resin insoluble in water in concentrations below 35% but soluble within the range of concentrations from 35% to 70%, consisting of 10 parts by weight of said resin, 50 parts of glycerol, 5 parts of hydroxy acetic acid, and 35 parts of water.

5. A method of forming a stable dispersion of a partially polymerized melamine-formaldehyde resin insoluble in water in concentrations below 35% but soluble within the range of concentrations from 35% to 70%, which comprises dispersing said resin in a non-basic water-soluble alcohol from the group consisting of dihydric and trihydric alcohols, and adding to the resulting dispersion from 0.4 to 0.6 part of hydroxy acetic acid per part of resin.

6. A method of forming a stable dispersion of a partially polymerized trimethylol melamine resin insoluble in water in concentrations below 35% but soluble within the range of concentrations from 35% to 70% which comprises dispersing said resin in a non-basic water-soluble alcohol from the group consisting of dihydric and trihydric alcohols, and adding to the resulting dispersion from 0.4 to 0.6 part of hydroxy acetic acid per part of resin.

7. The method of claim 6 wherein the alcohol is glycerol.

8. A method of forming a stable dispersion of a partially polymerized trimethylol melamine resin insoluble in water in concentrations below 35% but soluble within the range of concentrations from 35% to 70%, which comprises dispersing 10 parts by weight of said resin into 50 parts of glycerol, and adding to the resulting dispersion 5 parts of hydroxy acetic acid dissolved in 35 parts of water.

GILBERT PITZL.

REFERENCES CITED

The following references are of record in the file of this patent:

UNITED STATES PATENTS

| Number | Name | Date |
|---|---|---|
| 2,197,357 | Widmer | Apr. 16, 1940 |

---

Certificate of Correction

Patent No. 2,451,867.

October 19, 1948.

GILBERT PITZL

It is hereby certified that errors appear in the printed specification of the above numbered patent requiring correction as follows:

Column 1, line 45, and column 4, line 25, for "Cellophane" read *cellophane*; column 4, line 45, for "malamine" read *melamine*;

and that the said Letters Patent should be read with these corrections therein that the same may conform to the record of the case in the Patent Office.

Signed and sealed this 22nd day of February, A. D. 1949.

[SEAL]

THOMAS F. MURPHY,
*Assistant Commissioner of Patents.* sisting of 10 parts by weight of said resin, 50 parts of glycerol, 5 parts of hydroxy acetic acid, and 35 parts of water.

5. A method of forming a stable dispersion of a partially polymerized melamine-formaldehyde resin insoluble in water in concentrations below 35% but soluble within the range of concentrations from 35% to 70%, which comprises dispersing said resin in a non-basic water-soluble alcohol from the group consisting of dihydric and trihydric alcohols, and adding to the resulting dispersion from 0.4 to 0.6 part of hydroxy acetic acid per part of resin.

6. A method of forming a stable dispersion of a partially polymerized trimethylol melamine resin insoluble in water in concentrations below 35% but soluble within the range of concentrations from 35% to 70% which comprises dispersing said resin in a non-basic water-soluble alcohol from the group consisting of dihydric and trihydric alcohols, and adding to the resulting dispersion from 0.4 to 0.6 part of hydroxy acetic acid per part of resin.

7. The method of claim 6 wherein the alcohol is glycerol.

8. A method of forming a stable dispersion of a partially polymerized trimethylol melamine resin insoluble in water in concentrations below 35% but soluble within the range of concentrations from 35% to 70%, which comprises dispersing 10 parts by weight of said resin into 50 parts of glycerol, and adding to the resulting dispersion 5 parts of hydroxy acetic acid dissolved in 35 parts of water.

GILBERT PITZL.

REFERENCES CITED

The following references are of record in the file of this patent:

UNITED STATES PATENTS

| Number | Name | Date |
|---|---|---|
| 2,197,357 | Widmer | Apr. 16, 1940 |

Certificate of Correction

Patent No. 2,451,867.

October 19, 1948.

GILBERT PITZL

It is hereby certified that errors appear in the printed specification of the above numbered patent requiring correction as follows:

Column 1, line 45, and column 4, line 25, for "Cellophane" read *cellophane*; column 4, line 45, for "malamine" read *melamine*;

and that the said Letters Patent should be read with these corrections therein that the same may conform to the record of the case in the Patent Office.

Signed and sealed this 22nd day of February, A. D. 1949.

[SEAL]

THOMAS F. MURPHY,
*Assistant Commissioner of Patents.*